US010681277B1

(12) United States Patent
Kulik et al.

(10) Patent No.: US 10,681,277 B1
(45) Date of Patent: Jun. 9, 2020

(54) TRANSLATION COMPENSATION IN OPTICAL IMAGE STABILIZATION (OIS)

(71) Applicant: QUALCOMM Incorporated, San Diego, CA (US)

(72) Inventors: Victor Kulik, San Jose, CA (US); Mehul Soman, Sunnvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/295,146

(22) Filed: Mar. 7, 2019

(51) Int. Cl.
  *H04N 5/232* (2006.01)
  *H04N 5/225* (2006.01)
  *H04N 5/235* (2006.01)
  *H04N 5/238* (2006.01)

(52) U.S. Cl.
  CPC ....... *H04N 5/23258* (2013.01); *H04N 5/2254* (2013.01); *H04N 5/235* (2013.01); *H04N 5/238* (2013.01); *H04N 5/2352* (2013.01)

(58) Field of Classification Search
  CPC .. H04N 5/23258; H04N 5/235; H04N 5/2254; H04N 5/2352; H04N 5/238
  See application file for complete search history.

(56) References Cited

U.S. PATENT DOCUMENTS

| | | | | |
|---|---|---|---|---|
| 8,711,233 B2 * | 4/2014 | Jefremov | ........... | H04N 5/23264 348/208.4 |
| 2008/0166115 A1 * | 7/2008 | Sachs | ..................... | G03B 17/00 396/55 |
| 2014/0049658 A1 * | 2/2014 | Yamazaki | .......... | H04N 5/23254 348/208.11 |
| 2015/0085149 A1 * | 3/2015 | Tsubaki | ............. | H04N 5/23277 348/208.4 |
| 2015/0350550 A1 * | 12/2015 | Thivent | .............. | H04N 5/23287 348/208.11 |
| 2016/0044245 A1 * | 2/2016 | Tsubaki | ............. | H04N 5/23258 348/208.11 |
| 2016/0360111 A1 * | 12/2016 | Thivent | .............. | H04N 5/23287 |
| 2017/0054927 A1 * | 2/2017 | Lyon | .................... | H04N 5/2253 |
| 2017/0244881 A1 * | 8/2017 | Stec | ..................... | H04N 5/2329 |
| 2018/0167558 A1 * | 6/2018 | Hirai | .................. | H04N 5/23216 |
| 2019/0182424 A1 * | 6/2019 | Omari | .................. | G03B 17/561 |
| 2019/0222760 A1 * | 7/2019 | Takeuchi | ............. | H04N 5/2328 |
| 2019/0260943 A1 * | 8/2019 | Strobert, Jr. | ............ | G06F 3/017 |

* cited by examiner

Primary Examiner — Timothy J Henn
(74) Attorney, Agent, or Firm — Kilpatrick Townsend & Stockton, LLP

(57) ABSTRACT

Techniques described herein can address these and other issues by synchronizing the positioning of an adjustable lens in a camera assembly with the capture of an image frame by the image sensor and optimizing the position of the adjustable lens to reduce the amount of blur caused by translation of the camera assembly along a direction along the optical axis over the course of a frame. More specifically, techniques provide for moving the lens to a plurality of optimized positions, relative to the image sensor, over the course of a frame, to reduce motion blur in an image due to translation of the camera assembly in a direction of along the optical axis during the frame. Some embodiments may provide for "tight" synchronization in cases where the plurality of optimized positions are based on a time-dependent function that takes into account when each row of the image sensor is being exposed over the course of the frame.

36 Claims, 9 Drawing Sheets

TRANSLATION COMPENSATION IN OPTICAL IMAGE STABILIZATION (OIS)

BACKGROUND

Optical Image Stability (OIS) techniques improve the performance of camera assemblies by counteracting image blur due to camera unsteadiness or jitter and/or to compensate for rolling shutter distortions during image capture. This may be particularly important for camera assemblies incorporated into handheld devices such as mobile phones and tablet computing devices for still or video images. OIS techniques utilize one or more actuators coupled with a camera lens and/or an image sensor of the camera assembly that translate, tilt, and/or rotate the lens and/or sensor relative to the camera assembly in at least one of the pitch, roll, and yaw directions. As such, OIS techniques may largely or completely compensate for effects of camera motion, including rotation (that may be measured gyroscopically, for example) and translation (that may be measured by an accelerometer, for example) and/or rolling shutter effects.

Implementing these OIS techniques in a camera assembly, however, is not without its trade-offs. Due to power, size, cost, and/or other limiting constraints, some camera systems may have limited OIS functionality. Techniques for improving OIS functionality in these limited systems, therefore, can increase the user experience of such limited-capability camera systems.

SUMMARY

Techniques described herein can address these and other issues by synchronizing the positioning of an adjustable lens in a camera assembly with the capture of an image frame by the image sensor and optimizing the position of the adjustable lens to reduce the amount of blur caused by translation of the camera assembly along a direction along the optical axis over the course of a frame. More specifically, techniques provide for moving the lens to a plurality of optimized positions, relative to the image sensor, over the course of a frame, to reduce motion blur in an image due to translation of the camera assembly in a direction of along the optical axis during the frame. Some embodiments may provide for "tight" synchronization in cases where the plurality of optimized positions are based on a time-dependent function that takes into account when each row of the image sensor is being exposed over the course of the frame.

An example method of providing synchronized optical image stabilization in a camera assembly having an adjustable lens, according to the description, includes, for an image sensor of the camera assembly with sensor elements disposed in rows oriented in a direction along a first axis and columns oriented in a direction along a second axis, obtaining information indicative of the beginning of a frame of the image sensor, wherein the frame comprises a period of time having an exposure period followed by a readout period in which exposure values are read from the sensor elements row by row, and obtaining at least one distance value indicative of at least one distance of the image sensor to at least one object viewable by the image sensor. The method also includes, for each time of a plurality of times during the frame, obtaining respective movement data indicative of translation of the camera assembly in a direction along a third axis orthogonal to the first axis and the second axis, the translation corresponding to the respective time, determining a respective value of a time-dependent function based at least in part on the information indicative of the beginning of the frame, wherein the respective value of the time-dependent function is dependent on the respective time in relation to the frame, and causing the adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

An example camera assembly with optical image stabilization, according to the description, comprises a controller configured to be communicatively coupled with an image sensor with sensor elements disposed in rows oriented in a direction along a first axis and columns oriented in a direction along a second axis, one or more actuators configured to move an adjustable lens that focuses light onto the image sensor, and a motion sensor. The controller is configured to obtain information indicative of the beginning of a frame of the image sensor, wherein the frame comprises a period of time having an exposure period followed by a readout period in which exposure values are read from the sensor elements row by row. The controller is also configured to obtain at least one distance value indicative of at least one distance of the image sensor to at least one object viewable by the image sensor, and, for each time of a plurality of times during the frame, obtain respective movement data, from the motion sensor, indicative of translation of the camera assembly in a direction along a third axis orthogonal to the first axis and the second axis, the translation corresponding to the respective time, determine a respective value of a time-dependent function based at least in part on the information indicative of the beginning of the frame, wherein the respective value of the time-dependent function is dependent on the respective time in relation to the frame, and cause the one or more actuators to move the adjustable lens to a respective position relative to the image sensor during the frame, wherein the respective position in a direction along the first axis, in a direction along the second axis, or both, is at least partially based on the respective movement data, the respective value of the time-dependent function, and the at least one distance value.

An example apparatus, according to the description, comprises means for obtaining, for an image sensor of the apparatus with sensor elements disposed in rows oriented in a direction along a first axis and columns oriented in a direction along a second axis, information indicative of the beginning of a frame of the image sensor, wherein the frame comprises a period of time having an exposure period followed by a readout period in which exposure values are read from the sensor elements row by row, and means for obtaining at least one distance value indicative of at least one distance of the image sensor to at least one object viewable by the image sensor. The example apparatus further comprises means for, for each time of a plurality of times during the frame, obtaining respective movement data indicative of translation of the apparatus in a direction along a third axis orthogonal to the first axis and the second axis, the translation corresponding to the respective time, determining a respective value of a time-dependent function based at least in part on the information indicative of the beginning of the frame, wherein the respective value of the time-dependent function is dependent on the respective time in relation to the frame, and causing the adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

An example non-transitory computer-readable medium, according to the description, has instructions embedded thereon for providing synchronized optical image stabilization in a camera assembly having an adjustable lens. The instructions, when executed by one or more processing units, cause the one or more processing units to, for an image sensor of the camera assembly with sensor elements disposed in rows oriented in a direction along a first axis and columns oriented in a direction along a second axis, obtain information indicative of the beginning of a frame of the image sensor, wherein the frame comprises a period of time having an exposure period followed by a readout period in which exposure values are read from the sensor elements row by row, obtain at least one distance value indicative of at least one distance of the image sensor to at least one object viewable by the image sensor, and, for each time of a plurality of times during the frame, obtain respective movement data indicative of translation of the camera assembly in a direction along a third axis orthogonal to the first axis and the second axis, the translation corresponding to the respective time, determine a respective value of a time-dependent function based at least in part on the information indicative of the beginning of the frame, wherein the respective value of the time-dependent function is dependent on the respective time in relation to the frame, and cause an adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

Figure 1:
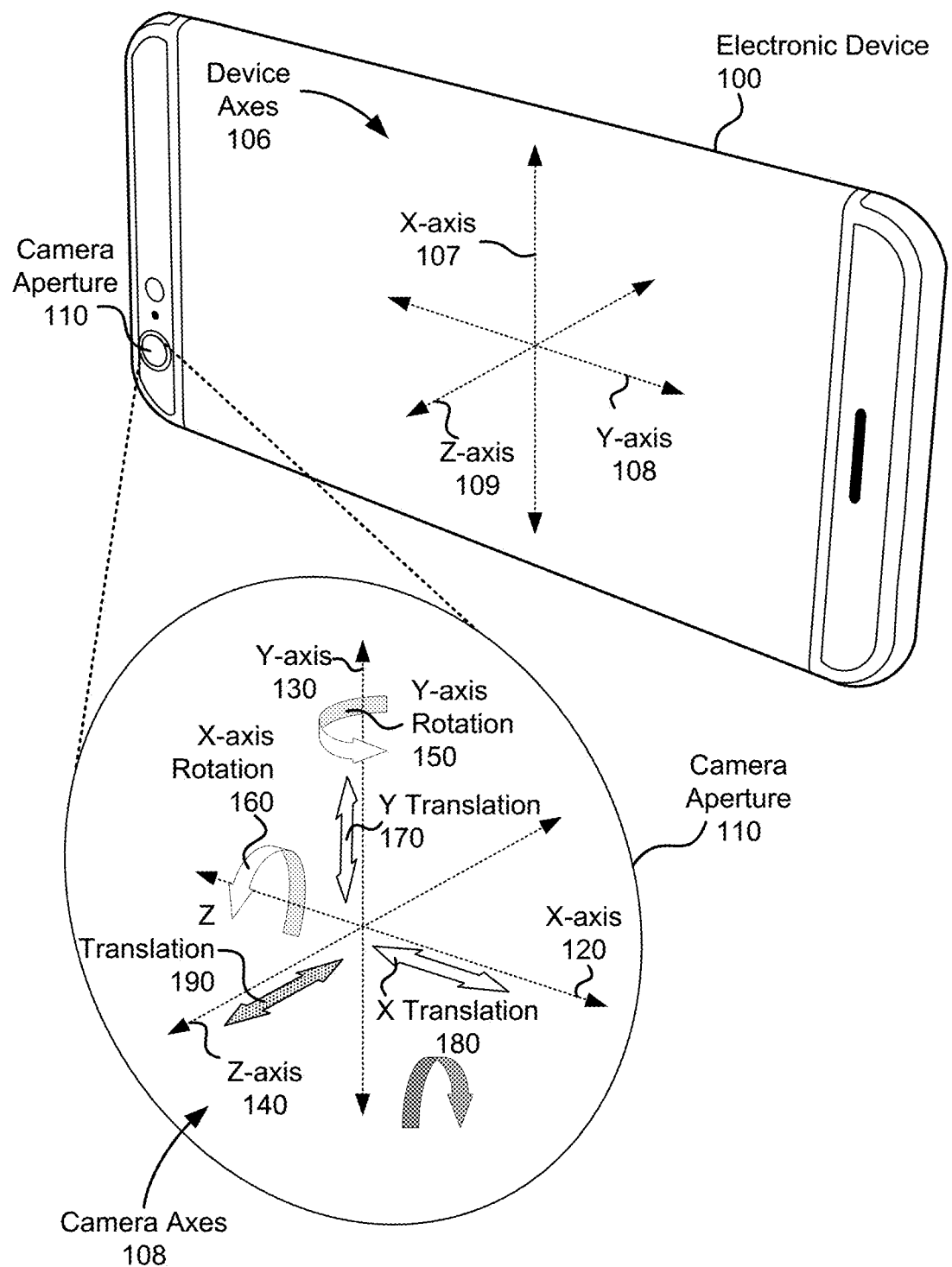
FIG. 1 is a diagram of an electronic device with a camera assembly, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. Additionally, the described embodiments may be implemented in any device, apparatus, or system that incorporates a camera, such as mobile telephones, multimedia Internet enabled cellular telephones, mobile television receivers, wireless devices, smartphones, wearable devices, personal data assistants (PDAs), wireless electronic mail receivers, hand-held or portable computers, tablets, cameras, digital media players (such as MP3 players), camcorders, game consoles, wrist watches, mobile health devices, and so forth, as well as larger systems (e.g., automobiles, smart buildings, etc.) that incorporates such electronics.

It can be noted that, as used herein, the terms "image frame" and "frame" refer to a period of time in which an image is captured from an image sensor (e.g., a CMOS sensor). This includes an exposure period in which photosensitive sensor elements of the image sensor are configured to sense light and produce a corresponding value (e.g., a voltage) indicative of and amount of light sensed during the exposure period, and a readout period in which exposure values of the sensor elements are read and processed by image processing circuitry. For rolling-shutter cameras, the exposure values of the sensor elements are read out a row at a time (row-by-row) over the course of the readout period.

It can be additionally noted that, as a matter of convention, an image sensor as described in the embodiments herein is described with regard to a coordinate frame having mutually-orthogonal x, y, and z axes, where rows of image sensor are aligned with an x-axis of the image sensor and columns are aligned with a y-axis of the image sensor. The optical axis of the image sensor therefore corresponds to the z-axis. The axes of the camera assembly comprising the image sensor. (This coordinate frame is illustrated in applicable figures, to help illustrate how the various figures are oriented within the coordinate frame.) The coordinate system for an electronic device incorporating the camera assembly may be the same, or may be different, depending on convention. The person of ordinary skill in the art will recognize that values of magnitude and/or angles utilized within this coordinate frame may be positive or negative, depending on the convention used. As such, variables disclosed in mathematical formulas, equations, and/or expressions provided herein may be positive or negative, depending on convention.

FIG. 1 is a diagram of an electronic device 100 with a camera assembly, according to an embodiment. A person of ordinary skill in the art will appreciate that, although a mobile phone is pictured as the electronic device 100, a variety of alternative devices may also have a camera assembly and may therefore utilize techniques for optical image stabilization (OIS) described herein. In this example, the coordinate system for the electronic device 100 is different than the coordinate system of the camera assembly, as shown by device axes 104 and camera axes 106. In particular the x-axis 107 and y-axis 108 of the device axes 104 are respectively aligned with the y-axis 130 and x-axis 120 of the camera axes 108. For convention, and as previously mentioned, embodiments described herein use a coordinate frame with respect to the camera aperture 110 as illustrated by camera axes 108, with mutually orthogonal axes (the x-axis 120, the y-axis 130, and the z-axis 140). The camera aperture 110 provides an opening for light to illuminate the image sensor of a camera assembly (not shown) incorporated into the electronic device 100, where the image sensor utilizes the coordinate frame of the camera axes. Accordingly, embodiments shown in the figures and described below utilize the camera axes 108 (not the device axes 106).

In the orientation illustrated in FIG. 1, (i.e., "landscape" orientation, where rows of the image sensor along the x-axis 120 are horizontal), y-axis rotation 150 represents a change in the yaw of the electronic device 100, and x-axis rotation 160 represents a change in the pitch of the electronic device 100. (In a "portrait" orientation, where rows of the image sensor along the x-axis 120 are vertical, pitch would correspond to y-axis rotation 150 and yaw would correspond to x-axis rotation 160.) Traditional 2-axis OIS systems may provide for blur compensation due to x-axis rotation 150 and y-axis rotation 150. Traditional 4-axis is OIS systems may further provide blur compensation for y translation 170 (i.e., translation in a direction of the y-axis 130) and x translation 180 (i.e., translation in a direction of the x-axis 120).

The techniques disclosed herein provide for blur reduction due to z-axis (optical axis) translation 190. Because these techniques utilize lens displacement in a direction along the x-axis 120 and/or y-axis 130, they may be implemented by traditional 2-axis OIS systems and/or 4-axis OIS systems that are capable of such x- and y-axis lens displacement. Moreover, the techniques herein are additive, and may therefore be used simultaneously with traditional 2-axis OIS and/or 4-axis OIS, thereby effectively providing 3-axis OIS and/or 5-axis OIS, respectively. An example of a camera assembly capable of implementing the blur reduction techniques disclosed herein is provided in FIG. 2

Figure 2:
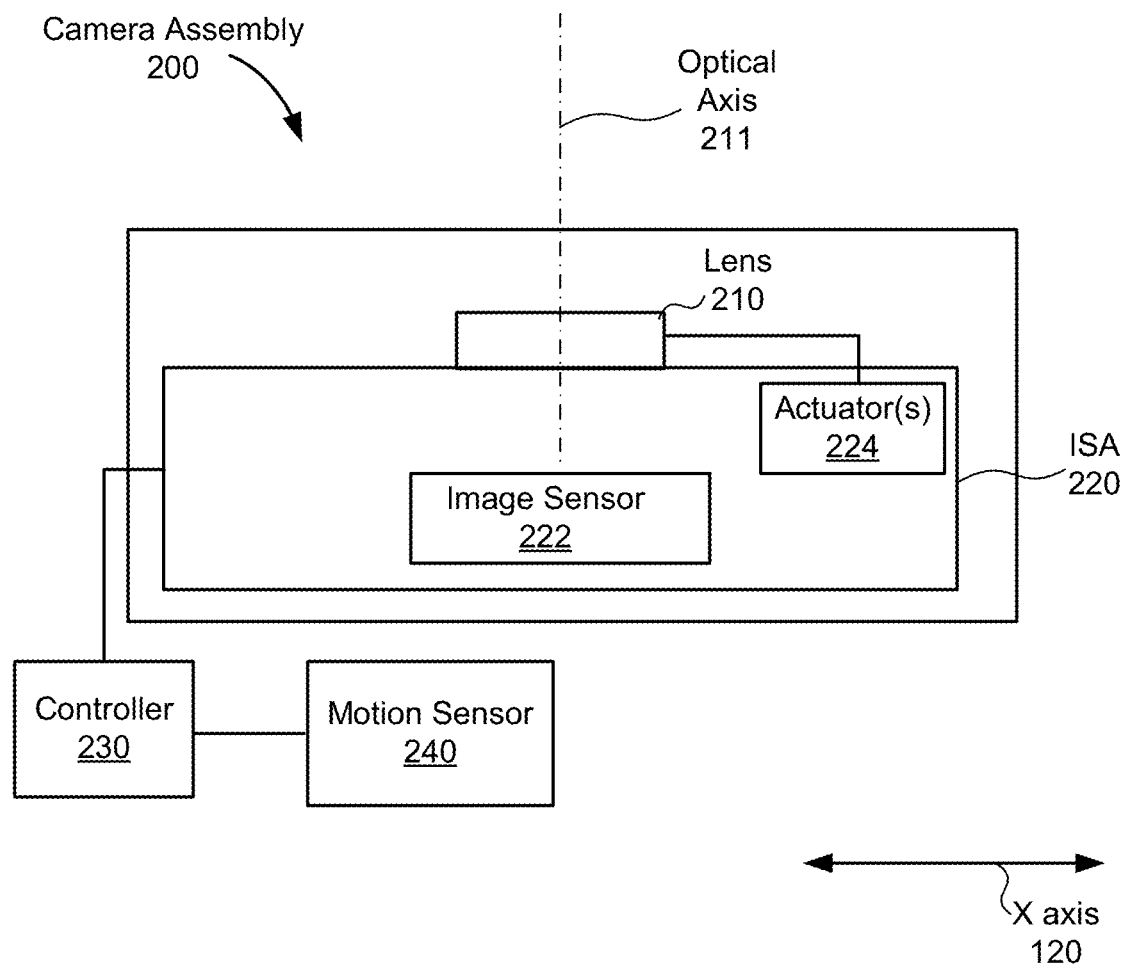
FIG. 2 is a simplified cross-sectional view of a camera assembly, according to an embodiment.

FIG. 2 is a simplified cross-sectional view of a camera assembly 200, according to an embodiment. Some or all components of the camera assembly 200 may be integrated into a larger electronic device, such as the electronic device 100 of FIG. 1. In the illustrated implementation, a camera assembly 200 includes a lens 210 and an image stabilizing arrangement (ISA) 220. The ISA 220 may include an image sensor 222 optically coupled with the lens 210 and an actuator(s) 224 mechanically coupled with the lens 210. Although only on actuator 224 is illustrated, one or more actuator(s) 224, which in some implementations may comprise a voice coil motor (VCM) actuator, may be coupled with the lens 210 and positioned to shift (or translate) the lens 210 in a direction along the x-axis 120 and/or y-axis (not shown, but orthogonal to the xz plane). Thus, actuator(s) 224 may be configured to move the lens 210 to various locations in the xy plane, orthogonal to the optical axis 211. (As previously noted, the optical axis 211 is the z-axis 140.) In some embodiments, one or more actuators additionally or alternatively may be used to translate the image sensor 222 with respect to the lens 210 in a similar manner. (Other embodiments may be additionally capable of translating the lens 210 and/or image sensor 222 along the optical axis 211 and/or rotating the lens 210 and/or image sensor 222, depending on the type of OIS implemented.) In some embodiments, the camera assembly 200 may include an adjustable aperture (not shown), which can be used to adjust an amount of light to which the image sensor 222 is exposed.

The camera assembly 200 further includes a controller 230, communicatively coupled with the ISA 220 and at least one motion sensor 240 for measuring camera motion. The controller may comprise a processing unit (e.g., a microprocessor, digital signal processor (DSP), application-specific integrated circuit (ASIC), a programmable gate array (PGA) or similarly programmable circuitry, which may be configured to interact with the other components of the camera assembly 200 as described herein. As such, the controller 230, may be configured to execute software stored in a non-transitory computer-readable medium.

The motion sensor 240 may comprise a gyroscope, an accelerometer, and/or any other type of motion sensor capable of determining rotational and/or translational movement of the camera assembly 200 (e.g., which reflect rotational and/or translational movement of an electronic device 100 into which the camera assembly 200 is integrated, as shown in FIG. 1). In some embodiments, a camera assembly 200 may not have a motion sensor 240 dedicated to OIS. In such embodiments, the controller 230 may obtain motion data from other components of an electronic device into which the camera assembly 200 is integrated.

OIS is used to reduce blurring and other effects associated with movement of the camera assembly 200 during the time the image sensor 222 is capturing an image (e.g., the exposure period of a frame). Put generally, the motion sensor 240 (which may be configured to capture motion data at a certain frequency) provides motion data to the controller 230 regarding movement of the camera assembly 200. The controller 230 causes the actuator(s) 224 to move the lens 210 in the xy plane in a manner that compensates for the movement and minimizes blur in an image captured by the image sensor 222 caused by the motion of the camera assembly. Thus, an amount of OIS lens shift is proportional to the amount of movement.

For a camera assembly 200 that moves the lens 210 in a plane parallel to the image sensor 222 (e.g., the xy plane), there is a limitation of non-uniform image quality improvement. This is because lens 210 and/or image sensor 222 shift in the xy plane can only cause uniform image shift by so many pixels. This can be a particular challenge when the motion blur is due to translation in a direction along the optical axis 211, when good compensation would require non-uniform shift.

Figure 3:
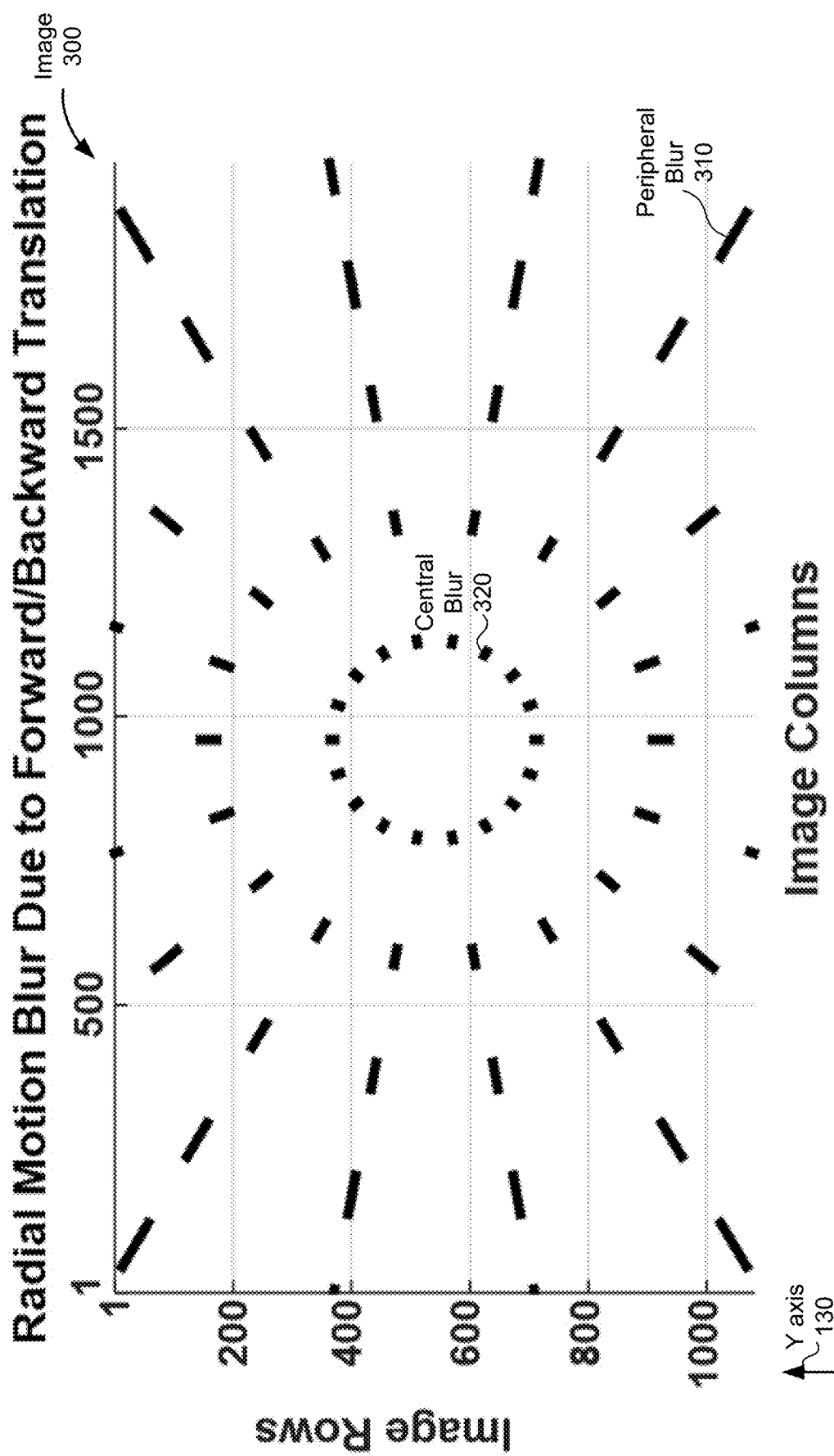
FIG. 3 is a graph illustrating example motion blur in an image due to translation movement in a direction along the optical axis during image capture.

FIG. 3 is a graph illustrating motion blur in an image 300, due to translation movement in a direction along the optical axis during image capture. Here, the image 300 comprises an array of pixels having (as an example) 1080 rows and 1920 columns. (Alternative embodiments may have different resolutions and/or aspect ratios.) Pixels in the image 300 correspond to sensor elements of the image sensor 222 disposed in corresponding rows and columns in the xy plane. Thus, image rows are aligned with the x-axis 120 and columns are aligned with the y-axis 130, as shown.

As shown, blurring near the periphery of the image is larger than blurring near the center of the image. (Peripheral blur 310 is larger than central blur 320.) Accordingly, an OIS correction due to lens shift in the xy plane, which corrects blurring uniformly, may undercompensate for blurring near the periphery of the image and/or overcompensate for blurring near the center of the image 300. However, if an "area of interest" within the image is determined, OIS lens shift may be modified to compensate for roll in a manner that moves the clearest area of the image 300 from the center of the image 300 to the area of interest. (This modification of lens shift is also called "lens shift adjustment.")

It can be noted that the blurring effect illustrated in image 300, is for an image of a target at uniform distance from the image sensor 222. Blurring can vary, depending on speed of translation and the distance of the target. More specifically, blurring due to parallax, which may be estimated as:

$$\text{Parallax} = \frac{\text{Translation}}{\text{Distance to target}} \quad (1)$$

Traditional 4-axis OIS typically compensates for parallax due to translation along the x- and/or y-axis using a common distance for all features, as if the target were flat. Moreover, traditional 4-axis OIS also typically only performs this compensation for close-up photography, where a small distance to the target leads to a large parallax.

However, as described in further detail herein, techniques for adjusting OIS lens shift to provide blur reduction due to optical axis translation as described herein can optimize blur reduction for non-flat (3-D) target support and/or take into account blur due to not only a small distance to the target, but also large translation (high-speed movement). Such blur reduction may reduce blur at one or more locations within an image 300 by moving the sharpest portion of the image 300 (known as the "vanishing point") from the center to an "area of interest" centered elsewhere in the image 300, or provide optimal OIS lens shift for each row of the image 300, based "tight" synchronization with a frame to determine when rows of the image sensor 222 are exposed over the course of a frame. Additional details regarding these embodiments are provided herein below.

Figure 4:
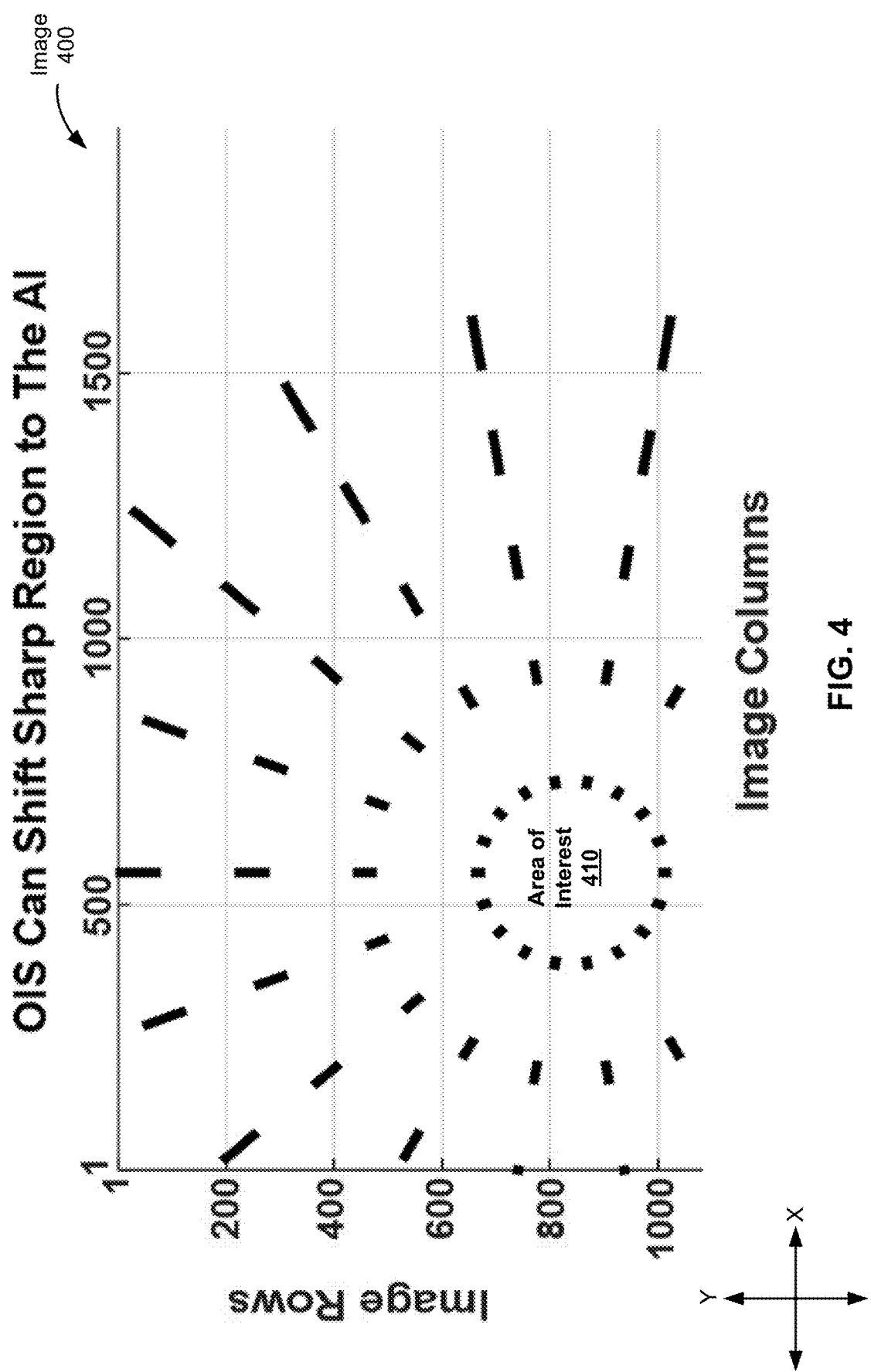
FIG. 4 is a graph illustrating example OIS motion blur adjustment for an area of interest in an image, according to an embodiment.

FIG. 4 is a graph illustrating motion blur in an image 400, which, similar to FIG. 3, is due to translation movement in a direction along the optical axis during image capture. Here, however, OIS lens shift has been adjusted during the course of the image capture such that the vanishing point (with very little blur due to the Z translation) is located at an area of interest 410, rather than at the center of the image 400. The area of interest may be determined automatically by the electronic device 100 (e.g., centered at a location of a face or other detected objects, which may be determined from one or more preliminary images) or manually by a user of the electronic device.

For an area of interest 410 centered at a particular row (Row) and column (Col), the x and y components of the stretch/compression speed at the area of interest can be calculated as:

$$AI_{Xspeed}(t) = \frac{ForwardTranslationSpeed(t)}{Distance(AI)} * (Col - MidColumn), \quad (2)$$

for the x component, and $$AI_{Yspeed}(t) = \frac{ForwardTranslationSpeed(t)}{Distance(AI)} * (Rol - MidRow), \quad (3)$$

for the y component. Here, the terms MidRow and MidColumn respectively refer to the row and column numbers of the middle row and middle column of the image 400. (In the image 400 of FIG. 4, for example, which has 1080 rows and 1920 columns, MidRow would equal 540 and MidColumn would equal 960.) The term ForwardTranslationSpeed(t) refers to the speed of the translation along the direction of the optical axis (which may be obtained, for example, by an accelerometer or other component of a motion sensor 240), and Distance(AI) refers to a distance of the target at the location of the area of interest, which may be obtained, for example, from the focus position.

As noted above, terms (2) and (3) are values that indicate the amount of stretch/compression speed at the area of interest at time t during a frame to compensate for translation in a direction along the optical axis at time t. Because this is additive to other types of OIS, such as 2-axis OIS or 4-axis OIS, these terms may be added to existing x and y OIS lens shift. That said, because terms (2) and (3) are in units of pixels/s, they may need to first be converted to radians/s by dividing over the focal length of the camera assembly 200 when added to existing OIS lens shift.

For example, terms (2) and (3) may be added to 4-axis OIS lens shift to provide lens shift for "5-axis" OIS by calculating adjusted x and y OIS lens shift as follows:

$$Xgyro_{adj}(t) = Xgyro(t) + \frac{XTranslationSpeed(t)}{Distance(AI)} + \frac{AI_{Xspeed}(t)}{FL}, \quad (4)$$

for OIS lens shift in a direction along the x axis, and $$Ygyro_{adj}(t) = Ygyro(t) + \frac{YTranslationSpeed(t)}{Distance(AI)} + \frac{AI_{Yspeed}(t)}{FL}, \quad (5)$$

for OIS lens shift in a direction along the y axis. The terms Xgyro(t) and Ygyro(t) are OIS lens shift values accounting for blur in the x and y directions due to yaw and pitch movements, thus these terms provide for 2-axis OIS. The additional terms XTranslationSpeed(t)/Distance(AI) and YTranslationSpeed(t)/Distance(AI) respectively account for translation in directions along x and y axes, providing 4-axis OIS when added to the terms for 2-axis OIS lens shift. (Here, the terms XTranslationSpeed(t) and YTranslationSpeed(t) are measurements of speed in directions along x and y axes, respectively, at time t.) Thus, adding the terms $AI_{Xspeed}(t)/FL$ and $AI_{Yspeed}(t)/FL$ to the 4-axis OIS lens shift, providing OIS compensation due to movement in a direction along the optical axis, results in 5-axis OIS.

According to some embodiments, OIS lens shift adjustment in this manner can be applied to multiple areas of interest within an image by "tightly" synchronizing lens movement with a frame such that the lens 210 moves to optimize OIS compensation differently for different rows of the image.

Figure 5:
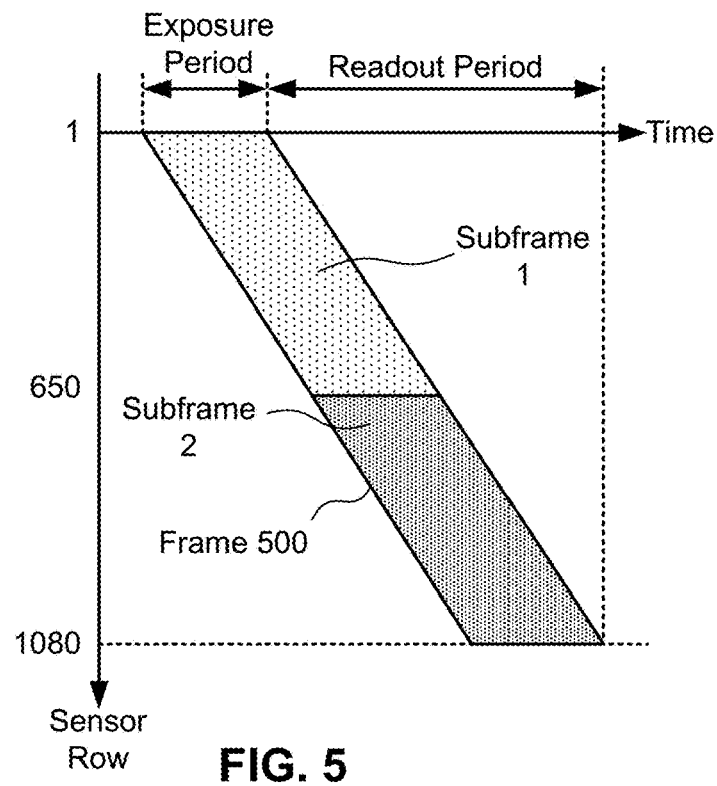
FIG. 5 is a frame graph showing how the image sensor may capture an image frame, according to an embodiment.

FIG. 5 is a frame graph showing how the image sensor 222 captures an image frame by first subjecting rows to an exposure period, then reading out rows, row by row, during a readout period. As with other figures herein, FIG. 5 shows an example having 1080 rows (e.g., high definition (HD) video quality), although alternative embodiments may vary in the number of rows each frame has. The frame 500 is captured by a camera assembly having a rolling shutter. Therefore, the frame 500 begins with an exposure period followed by a readout period. More specifically, after exposure values for photosensitive sensor elements (image sensor pixels) in a row are reset, the row is subject to an exposure period, after which exposure values for the sensor elements are read and processed with downstream image processing circuitry. This exposure and readout occurs row-by-row, starting with row 1. Thus, the frame 500 begins with the exposure of the first row (row 1) and ends with the readout of the exposure values of the last row (row 1080).

It can be noted that, as used herein, the term "readout period" may refer to the time it takes to read the rows of the frame, which may be smaller than native amount of rows of the image sensor 222. For example, in the case of video cropping or digital zoom, only a subset of the rows of an image sensor 222 may be read. And thus, the readout period corresponds to the period of time in which the subset of rows is read. Thus, as used herein, the term "readout period" may refer to this "effective" readout period.

In this example, the frame 500 is split into two subframes, Subframe 1 and Subframe 2, as illustrated, to provide OIS compensation for optical axis translation for two areas of interest at two locations within the image. The first area of interest is located within the first half of the rows, and the second area of interest is located in the second half of the rows. It will be understood, however, that subframes may be unequally divided such that one subframe is larger than the other. Moreover, a frame may be divided into more than two subframes to accommodate more than two areas of interest. In FIG. 5, OIS lens shift may be tuned during Subframe 1 in accordance with expressions (4) and (5) to provide OIS compensation due to optical axis translation in the resulting image for a first area of interest, and then "retuned" during Subframe 2 to provide OIS compensation for optical axis translation for a second area of interest.

Figure 6:
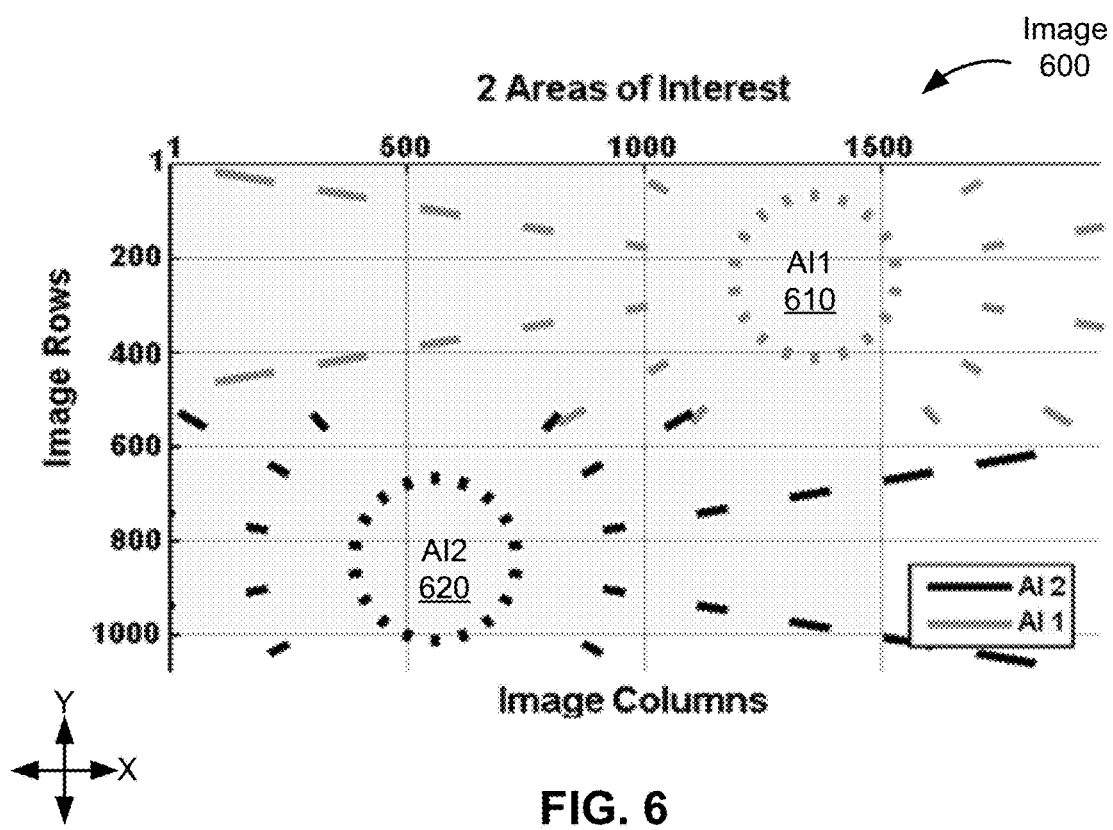
FIG. 6 is a graph illustrating OIS motion blur compensation for optical axis translation in an image having two areas of interest, according to an embodiment.

FIG. 6 illustrates the blur in the resulting image 600. As can be seen, optical axis translation blur is reduced in a first half of the image 600 with respect to a first area of interest, AI1 610, and also reduced in a second half of the image 600 with respect to a second area of interest, AI2 620. As previously noted, this concept may be extended to provide optical axis translation compensation for images having any a plurality of areas of interest. However, because sensor elements of the image sensor 222 are read out a row at a time, and because adjustments to the position of the lens 210 in the xy plane apply correction uniformly across the row, optical axis translation compensation may only be applied to areas of interest occurring on different rows of the image 600. As previously noted, areas of interest may be identified using any of a variety of techniques, including manual user input and/or an object detection algorithm (e.g., a face-detection executed by the electronic device 100).

Figure 7:
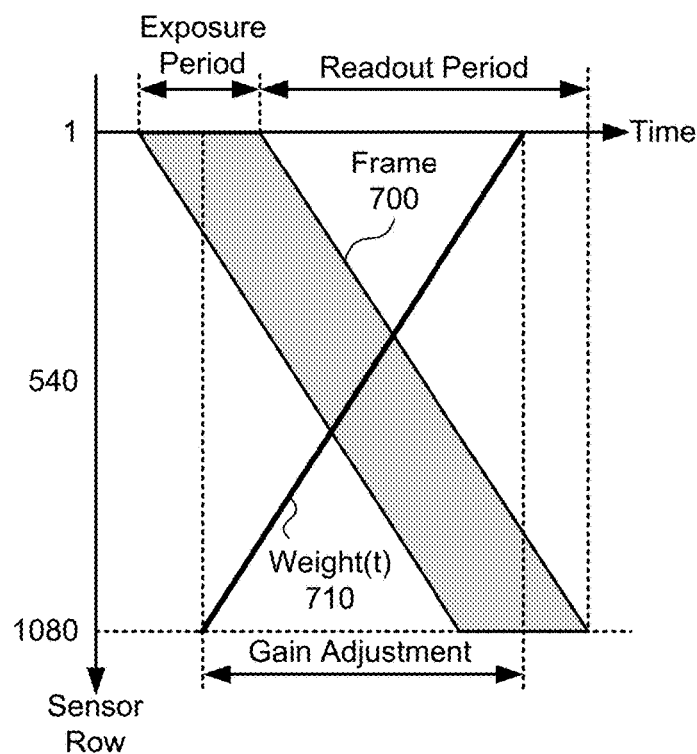
FIG. 7 is a frame graph, similar to FIG. 5, illustrating exposure and readout of sensor rows over the course of a frame.

According to some embodiments, these concepts may be extended not only to multiple areas interest, but to every row in an image. That is, rather than retuning the OIS lens shift for a small number of subframes, embodiments may continually retune the OIS lens shift, as rows of the image sensor 222 are being exposed, to provide OIS compensation for optical axis translation for every row. FIGS. 6 and 7 help illustrate how this may be done.

FIG. 7 is a frame graph, similar to FIG. 6, illustrating exposure and readout of sensor rows over the course of a frame 700. Here, however, rather than dividing the frame 700 in subframes and calculating an adjusted OIS shift using expressions (4) and (5) for each subframe, OIS may be retuned on a per-row basis, depending on which row is being exposed at a given time t. This causes the adjustment in OIS shift to vary over time, optimizing optical axis translation compensation as each row is exposed. FIG. 7 also superimposes the value of a time-dependent function used, Weight(t) 710, over the frame 700 to illustrate the change in value of Weight(t) over time. As can be seen, the Weight(t) may comprise a linear function of time.

As an example, the y-axis OIS lens shift as calculated in expression (5) may be modified as follows:

$$Ygyro_{adj}(t) = Ygyro(t) + \frac{YTranslationSpeed(t)}{Distance} + \frac{ZTranslationSpeed(t)*Weight(t)}{Distance}, \quad (6)$$

where Distance is the distance to the target, ZTranslation Speed(t) is a speed of translation in a direction along the optical axis, and Weight(t) is an approximately linear function of time as follows:

$$Weight(t) = \frac{Row(t) - MidRow}{FL}. \quad (7)$$

Here, Row(t) is the value of the row exposed at time t.

In the expression (6), the term Distance may be a static term that does not vary across over the course of the frame 700. It may be chosen, for example, based on a distance to a target, and may be determined by an autofocus algorithm, for example. However, according to some embodiments, the term Distance may be replaced with a time-dependent term, Distance(t), that varies over the course of the frame 700 based on which row is exposed at time t. That is:

$$Distance(t)=Distance(Row(t)). \quad (8)$$

This optimal distance for each row can be computed from the Phase Detection Auto Focus (PDAF)-derived depth map and/or other autofocus related technologies, for example. Some embodiments may utilize active methods such as time of light or structured light. Some embodiments may use passive methods, such as depth from a stereoscopic (for example, dual) camera. Indirect methods additionally or alternatively may be used, such as mapping the current lens position to a distance (where accuracy may depend on the autofocus actuator quality and calibration) or using a PDAF-derived depth map (where it is possible to estimate before and/or after focus on different regions, and use the data differently (e.g., optimize OIS translation compensation accounting for variance in distances in the PDAF-derived depth map) compared to the current lens position). According to some embodiments, the PDAF depth map may also provide prioritization information, indicating which scene elements are more important than others.

Using expression (8), expression (6) can then be modified as follows:

$$Ygyro_{adj}(t) = Ygyro(t) + \frac{YTranslationSpeed(t)}{Distance(t)} + \frac{ZTranslationSpeed(t)*Weight(t)}{Distance(t)}. \quad (9)$$

The synchronization of OIS with the frame can allow for the determination of which Row(t) is exposed at any time, t, in the frame. Thus, as opposed to FIG. 5, in which the OIS lens shift was synchronized with the frame capture to allow the OIS lens shift to be modified halfway through the frame, the embodiment illustrated in FIG. 7 is more "tightly" synchronized to the exposure of individual rows throughout the frame. As indicated in FIG. 7, OIS lens shift adjustment may be applied approximately halfway through the exposure period of each row. In other words, Row(t) may be calculated to be a row approximately halfway through its exposure period at time t, although embodiments may vary.

To provide such time synchronization, the controller 230 can obtain, via an interrupt or other data related to frame capture, information regarding when the frame begins, and what the exposure and readout periods are for the frame. Where interrupts are unavailable to the controller 230, the controller 230 may predict or calculate the beginning of a frame based on single frame timing. Such frame prediction in video can remain accurate for minutes because frame period is typically very stable in video.

With this information, and information regarding the number of rows in the sensor, the OIS can apply lens shift adjustment as shown. For an image sensor having 540 rows and an FL of 1500 pixels, the value of Weight(t) can vary from approximately −0.36 to 0.36. (Again, whether the value of Weight(t) is positive or negative for a given row may depend on the sign conventions used.)

Figure 8:
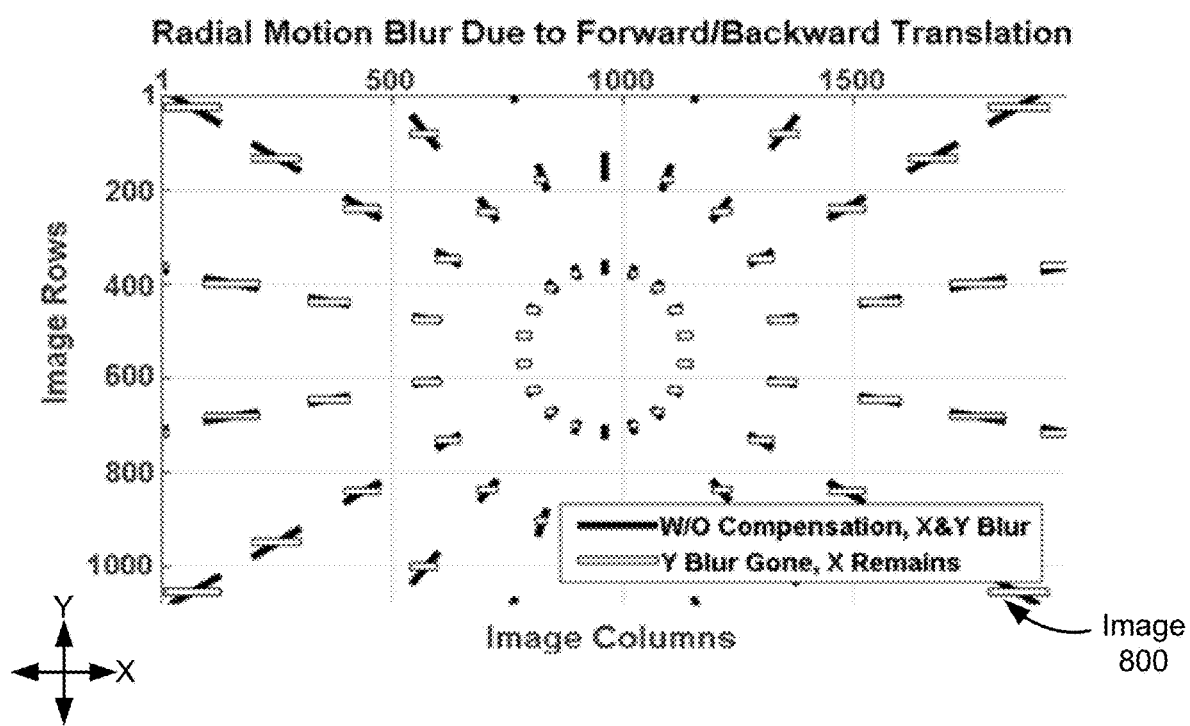
FIG. 8 is a graph illustrating how the OIS motion blur compensation for optical axis translation performed in FIG. 7 can reduce or eliminate motion blur in a direction along the y-axis of the resulting image, according to an embodiment.

FIG. 8 illustrates how the OIS motion blur compensation for optical (z) axis translation performed in FIG. 7 can reduce or eliminate motion blur in a direction along the y-axis of the resulting image 800. In FIG. 8, a comparison between uncompensated blur ("W/O Compensation") and compensation for optical axis translation as described herein ("Y Blur Gone"). As can be seen, compensation for optical axis translation greatly reduces motion blur in a direction along the y-axis.

Thus, tightly synchronized OIS lens shift adjustment as shown in FIG. 7 and described above can greatly reduce motion blur due to optical axis translation by eliminating the y component of motion blur. That said, the vertical component of the motion blur remains. This is because exposure value of sensor elements the image sensor 222 are read out a row to time, allowing embodiments to optimize for each row, but not each column. Although optimization is not additionally adjusted for each column, providing OIS lens shift adjustment in this way can be beneficial in many applications. If nothing else, it reduces the amount of motion blur due to optical axis translation by expanding an area that is relatively unaffected by motion blur from a center circular area (or vanishing point, e.g., as shown in FIG. 3) to a column that stretches from the top to the bottom of the image (as shown in FIG. 8).

In some embodiments, special considerations may be made to help ensure the blur compensation techniques herein are not used in cases where different rows of the image sensor 222 may be exposed at the same time for frames captured in succession, such as in video, or where an exposure period is significantly large relative to a readout period.

Figure 9:
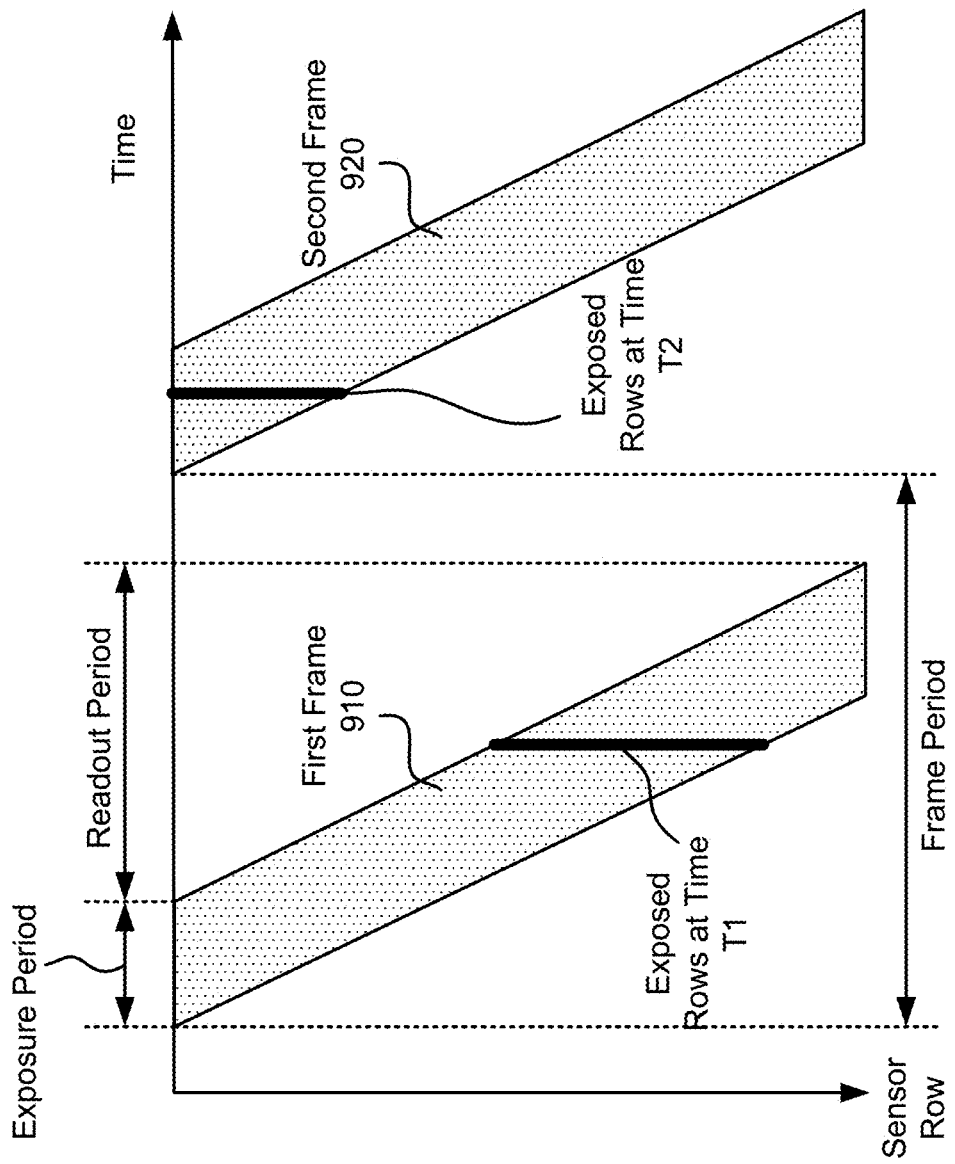
FIGS. 9 and 10 are frame graphs illustrating successively-captured frames.

FIG. 9 illustrates a frame graph to help illustrate this point. In FIG. 9, two frames, first frame 910 and second frame 920, are captured in succession. As can be seen, the exposure period, readout period, and frame period for the frames 910, 920 are such that there is no overlap in time between the frames. In other words (as shown by the exposed rows at time T1 and exposed rows at time T2, for example) at no time would different sets of rows of the image sensor be exposed for the different frames 910, 920, and at any given time, a relatively small percentage of the rows of the image sensor 222 are exposed. This may not be the case for frames having a relative long exposure period.

Figure 10:
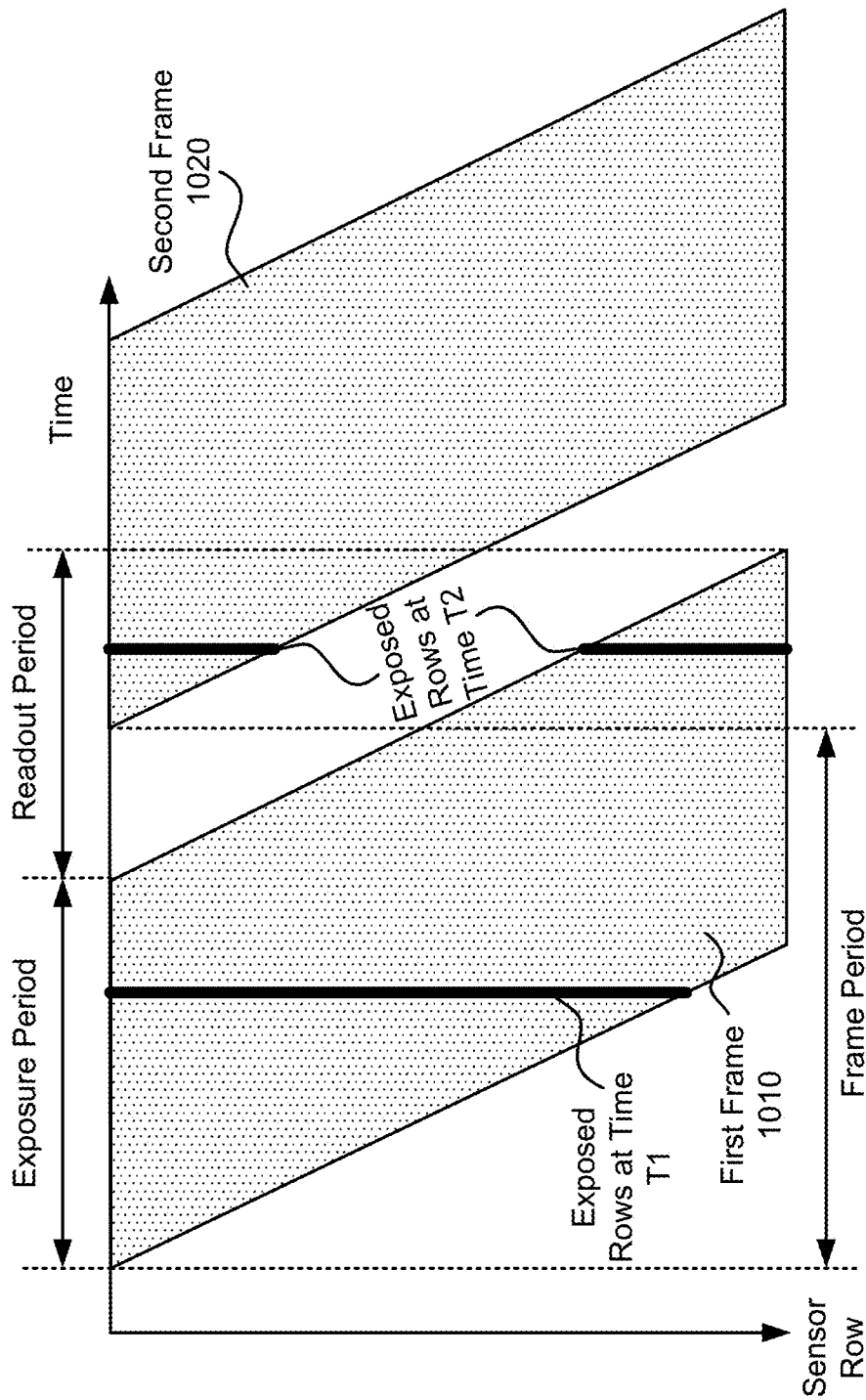

FIG. 10 illustrates a frame graph to help illustrate this point. Similar to FIG. 9, FIG. 10 shows two frames, First Frame 1010 and Second Frame 1020, captured in succession. Here, however, the exposure period is lengthened (e.g., due to low light and/or other conditions making an extended exposure period desirable). This may cause one or two issues to arise.

A first issue is that a long exposure period relative to the readout period can result in a large amount of rows exposed at a given time in a frame. At time T1, for example, nearly all rows are exposed. This can reduce the effectiveness of embodiments of tightly-synchronized OIS roll compensation techniques described herein, in which the lens position is based on the exposed rows, because more rows are exposed at once. This issue may arise in successively-captured frames (as shown) or single frames.

A second issue is that lengthening an exposure period can cause frames to overlap. For example, it may be desirable in some instances to maintain a certain frame rate (e.g., 30 frame per second (fps) video) even with longer exposure times. As such, there may be instances, such as at time T2 in FIG. 10, in which different rows of the image sensor 222 are exposed at the same time for different frames, presenting a problem for tightly-synchronized OIS roll compensation, where lens position is dependent on an exposed row. The two different sets of exposed rows would require the lens to be in two different positions.

To alleviate these issues, embodiments may employ the controller 230 or other processing unit to monitor the exposure period, readout period, and frame period of successively-captured frames. Where it is determined that frames might overlap and/or where an exposure period exceeds a threshold length relative to the length of the readout period (e.g., 50% or more, resulting in a large number of rows exposed simultaneously), the controller 230 or other processing unit may then decrease the length of the exposure period such that the length of the exposure period to a desired length (e.g., below the threshold length relative to the length of the readout period) and increase an ISO of the image sensor to at least partially compensate for the decrease in the length of the exposure period. Additionally or alternatively, if the camera assembly is capable of adjusting the aperture (i.e., reducing the focal ratio, or f-stop), the controller 230 or other processing unit may increase the aperture of the camera assembly to at least partially compensate for the decrease in the length of the exposure period. Additionally or alternatively, if the camera assembly is capable of adjusting the frame rate (i.e., increasing the frame period), the controller 230 or other processing unit may reduce the frame rate to ensure that frames do not overlap. Such adjustments may be performed, for example, in a still shot preview mode.

Figure 11:
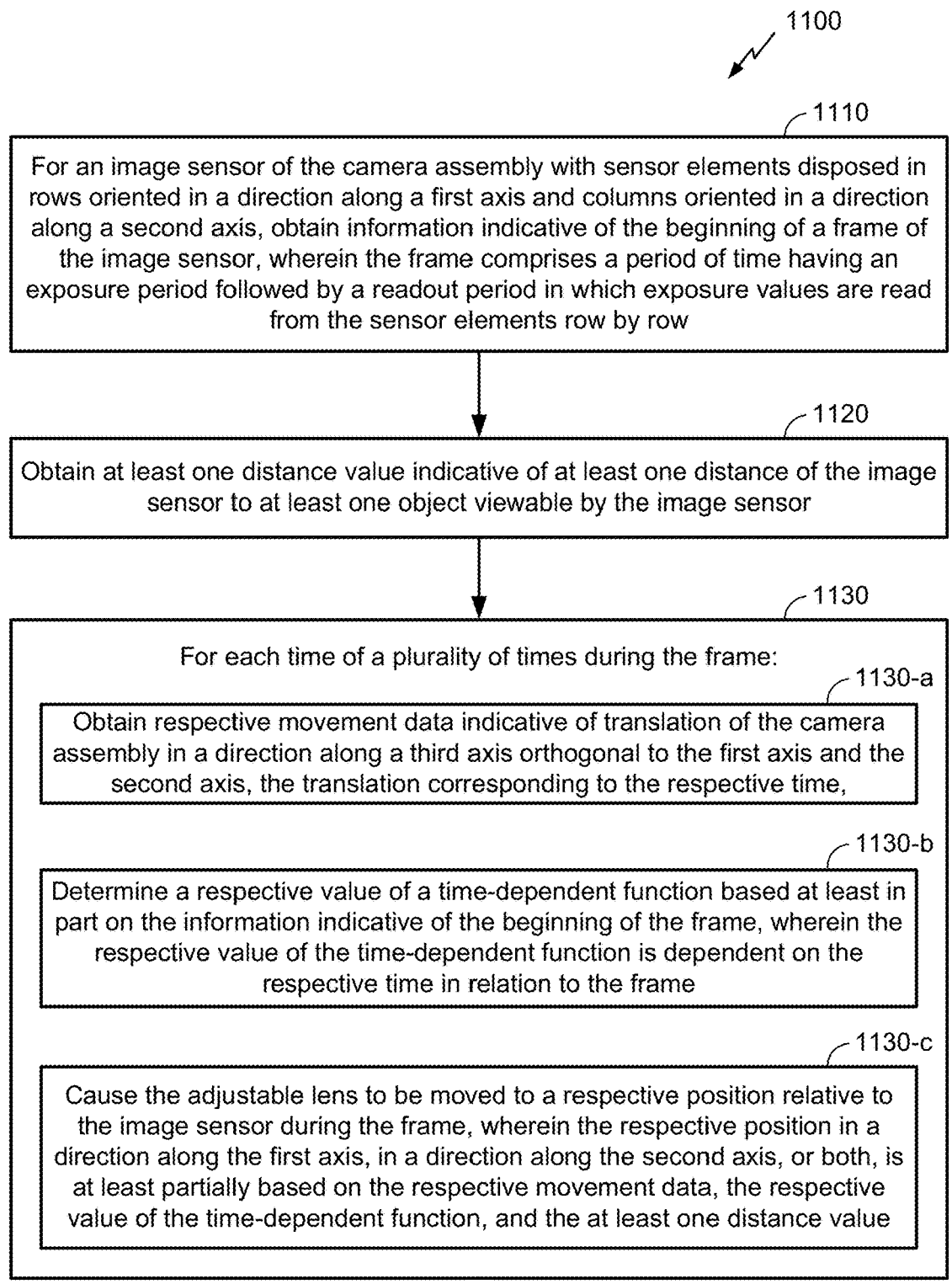
FIG. 11 is a flow diagram of a method of providing synchronized OIS in a camera assembly having an adjustable lens, according to an embodiment.

FIG. 11 is a flow diagram of a method 1100 of providing synchronized OIS in a camera assembly having an adjustable lens, according to an embodiment. Means for performing the method may include one or more components of the camera assembly, such as the camera assembly 200 in FIG. 2. In particular, the functionality described in the blocks of method 1100 may be performed by, for example, a processing unit (e.g., controller 230) capable of moving a lens in response to motion sensor data.

At block 1110, the functionality includes, for an image sensor of the camera assembly with sensor elements disposed in rows oriented in a direction along an first axis and columns oriented in a direction along a second axis, obtaining information indicative of the beginning of a frame of the image sensor, wherein the frame comprises a period of time having an exposure period followed by a readout period in which exposure values are read from the sensor elements row by row. As previously indicated, embodiments herein may be applied to camera assemblies having a rolling shutter in which sensor elements are read row by row, where rows are aligned in a direction along the first access (e.g., the x-axis), and columns are aligned in a direction along the second axis (e.g., the y-axis). Moreover, as noted elsewhere herein, obtaining information indicative of the beginning of a frame may comprise obtaining an interrupt or other direct indicator of the beginning of a frame. Additionally or alternatively, the beginning of a frame may be obtained from a calculation based on indirect data indicative of the beginning of a frame, such as the beginning of video capture.

At block 1120, the functionality includes obtaining at least one distance value indicative of at least one distance of the image sensor to at least one object viewable by the image sensor. Functionality can vary, as described in the embodiments above. For example, in FIGS. 4 and 6, one or more areas of interest may be identified, and a distance to each of the areas of interest may be determined, e.g. via an autofocus module of the camera assembly and/or electronic device. In some embodiments, the areas of interest may be prioritized, and this prioritization may be used in determining how to position the lens during the frame. For example, in alternative embodiments, the method 1100 may further comprise obtaining, from the autofocus module, at least one priority value related to the at least one distance value, where, for each time of the plurality of times during the frame, the respective position is additionally at least partially based on the at least one priority value related to the at least one distance value. Additionally or alternatively, the one or more areas of interest may be identified from user input. In some embodiments, one or more preliminary images may be captured and/or other sensor data may be obtained, from which areas of interest, distance, or both, may be determined.

At block 1130, the functionality comprises, for each time of a plurality of times during the frame, performing functions illustrated in blocks 1130-*a*, 1130-*b*, and 1130-*c*. At block 1130-*a*, the functionality includes obtaining respective movement data indicative of translation of the camera assembly in a direction along a third axis orthogonal to the first axis and the second axis, the translation corresponding to the respective time. At block 1130-*b*, the functionality includes, determining a respective value of a time-dependent function based at least in part on the information indicative of the beginning of the frame, where the respective value of the time-dependent function is dependent on the respective time in relation to the frame. And at block 1130-*c*, the functionality includes, causing the adjustable lens to be moved to a respective position relative to the image sensor during the frame, where the respective position in a direction along the first axis, in a direction along the second axis, or both, is at least partially based on the respective movement data, the respective value of the time-dependent function, and the at least one distance value.

As noted in the embodiments above, the time-dependent function may be at least partially based on a number of rows of sensor elements of the image sensor. As previously noted, the time-dependent function may comprise a linear time-dependent weight (e.g., Weight(t)).

Additionally or alternatively, a value of distance from the image sensor to an object of an area of interest or row may also be time-dependent (e.g., Distance(t)), although alternative embodiments may vary. Thus, in some embodiments, the information indicative of the at least one distance value of the image sensor to the at least one object, obtained at block 1120, comprises information indicative of a plurality of distance values, where each distance value is indicative of a distance of the image sensor to the least one object. For each time of the plurality of times during the frame, the at least one distance value can then comprise a respective distance value of the plurality of distance values.

As indicated previously in the description, and illustrated in FIGS. 9-10, the method may further comprise, prior to the beginning of the frame, determining the length of the exposure period and a length of the readout period. This can help determine whether a number of rows exposed at a time during the frame may be too numerous for the synchronized OIS stabilization to work effectively. The method may include monitoring these values and proceeding once it is determined that the they fall within a favorable range. Thus, embodiments of the method 1100 may additionally or alternatively comprise determining that the length of the exposure period does not exceed a threshold length in relation to the length of the readout period, where determining the respective value of the time-dependent function for each time of the plurality of times during the frame is in response to determining that the length of the exposure period does not exceed the threshold length of the readout period. As previously noted, this threshold length may vary, depending on desired functionality. In some embodiments, the threshold length of the exposure period may be approximately 50% of the length of the readout period. In other embodiments, the threshold may be less than this (e.g., 40%, 30%, or less) or greater than this (e.g., 60%, etc.).

In instances where the exposure period exceeds the threshold, some embodiments may allow for the reduction of this exposure period and the increase of the ISO and/or widening of an aperture to keep the sensor elements sufficiently exposed. For example, in some embodiments, prior to the beginning of the frame, the method 1100 may further include determining that a length of the exposure period exceeds a threshold length in relation to a length of the readout period and, in response to determining that the length of the exposure period exceeds the threshold length of the readout period, decreasing the length of the exposure period such that the length of the exposure period does not exceed the threshold length of the readout period, and at least partially compensating for the decrease in the length of the exposure period by increasing an ISO of the image sensor, widening an aperture of the camera assembly configured to adjust an amount of light to which the image sensor is exposed, or both.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., controller 230) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of providing synchronized optical image stabilization in a camera assembly having an adjustable lens, the method comprising:
   for an image sensor of the camera assembly with sensor elements disposed in rows oriented in a direction along a first axis and columns oriented in a direction along a second axis, obtaining information indicative of the beginning of a frame of the image sensor, wherein the frame comprises a period of time having an exposure period followed by a readout period in which exposure values are read from the sensor elements row by row;
   obtaining at least one distance value indicative of at least one distance of the image sensor to at least one object viewable by the image sensor; and
   for each time of a plurality of times during the frame:
      obtaining respective movement data indicative of translation of the camera assembly in a direction along a third axis orthogonal to the first axis and the second axis, the translation corresponding to the respective time;
      determining a respective value of a time-dependent function based at least in part on the information indicative of the beginning of the frame, wherein the respective value of the time-dependent function is dependent on the respective time in relation to the frame; and
      causing the adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

2. The method of claim 1, wherein the time-dependent function is indicative of which row of sensor elements of the image sensor is exposed at a given time.

3. The method of claim 1, wherein the time-dependent function is based on a number of rows of sensor elements of the image sensor.

4. The method of claim 1, wherein:
   the information indicative of the at least one distance value of the image sensor to the at least one object comprises information indicative of a plurality of distance values, wherein each distance value is indicative of a distance of the image sensor to the least one object; and
   for each time of the plurality of times during the frame, the at least one distance value comprises a respective distance value of the plurality of distance values.

5. The method of claim 1, wherein obtaining the at least one distance value comprises obtaining the at least one distance value from an autofocus module of the camera assembly.

6. The method of claim 5, further comprising obtaining, from the autofocus module, at least one priority value related to the at least one distance value, wherein, for each time of the plurality of times during the frame, the respective position is additionally at least partially based on the at least one priority value related to the at least one distance value.

7. The method of claim 1, further comprising, prior to the beginning of the frame, determining a length of the exposure period and a length of the readout period.

8. The method of claim 7, further comprising:
   determining that the length of the exposure period does not exceed a threshold length in relation to the length of the readout period;

wherein determining the respective value of the time-dependent function for each time of the plurality of times during the frame is in response to determining that the length of the exposure period does not exceed the threshold length of the readout period.

9. The method of claim 7, further comprising:
prior to the beginning of the frame, determining that a length of the exposure period exceeds a threshold length in relation to a length of the readout period; and
in response to determining that the length of the exposure period exceeds the threshold length of the readout period, decreasing the length of the exposure period such that the length of the exposure period does not exceed the threshold length of the readout period, and at least partially compensating for the decrease in the length of the exposure period by:
increasing an ISO of the image sensor,
widening an aperture of the camera assembly configured to adjust an amount of light to which the image sensor is exposed, or
both.

10. A camera assembly with optical image stabilization, the camera assembly comprising:
a controller configured to be communicatively coupled with:
an image sensor with sensor elements disposed in rows oriented in a direction along a first axis and columns oriented in a direction along a second axis;
one or more actuators configured to move an adjustable lens that focuses light onto the image sensor; and
a motion sensor;
wherein the controller is configured to:
obtain information indicative of the beginning of a frame of the image sensor, wherein the frame comprises a period of time having an exposure period followed by a readout period in which exposure values are read from the sensor elements row by row;
obtain at least one distance value indicative of at least one distance of the image sensor to at least one object viewable by the image sensor; and
for each time of a plurality of times during the frame:
obtain respective movement data, from the motion sensor, indicative of translation of the camera assembly in a direction along a third axis orthogonal to the first axis and the second axis, the translation corresponding to the respective time;
determine a respective value of a time-dependent function based at least in part on the information indicative of the beginning of the frame, wherein the respective value of the time-dependent function is dependent on the respective time in relation to the frame; and
cause the one or more actuators to move the adjustable lens to a respective position relative to the image sensor during the frame, wherein the respective position in a direction along the first axis, in a direction along the second axis, or both, is at least partially based on the respective movement data, the respective value of the time-dependent function, and the at least one distance value.

11. The camera assembly of claim 10, wherein the time-dependent function is indicative of which row of sensor elements of the image sensor is exposed at a given time.

12. The camera assembly of claim 10, wherein the time-dependent function is based on a number of rows of sensor elements of the image sensor.

13. The camera assembly of claim 10, wherein:
the information indicative of the at least one distance value of the image sensor to the at least one object comprises information indicative of a plurality of distance values, wherein each distance value is indicative of a distance of the image sensor to the least one object; and
for each time of the plurality of times during the frame, the at least one distance value comprises a respective distance value of the plurality of distance values.

14. The camera assembly of claim 10, wherein the controller is configured to obtain the at least one distance value at least in part by obtaining the at least one distance value from an autofocus module of the camera assembly.

15. The camera assembly of claim 14, wherein the controller is further configured to obtain, from the autofocus module, at least one priority value related to the at least one distance value, wherein, for each time of the plurality of times during the frame, the respective position is additionally at least partially based on the at least one priority value related to the at least one distance value.

16. The camera assembly of claim 10, wherein the controller is further configured to, prior to the beginning of the frame, determine a length of the exposure period and a length of the readout period.

17. The camera assembly of claim 16, wherein the controller is further configured to determine that the length of the exposure period does not exceed a threshold length in relation to the length of the readout period; and
wherein the controller is configured to determine the respective value of the time-dependent function for each time of the plurality of times during the frame in response to determining that the length of the exposure period does not exceed the threshold length of the readout period.

18. The camera assembly of claim 16, wherein the controller is further configured to:
prior to the beginning of the frame, determine that a length of the exposure period exceeds a threshold length in relation to a length of the readout period; and
in response to determining that the length of the exposure period exceeds the threshold length of the readout period, decrease the length of the exposure period such that the length of the exposure period does not exceed the threshold length of the readout period, and at least partially compensating for the decrease in the length of the exposure period by:
increasing an ISO of the image sensor,
widening an aperture of the camera assembly configured to adjust an amount of light to which the image sensor is exposed, or
both.

19. An apparatus comprising:
means for obtaining, for an image sensor of the apparatus with sensor elements disposed in rows oriented in a direction along a first axis and columns oriented in a direction along a second axis, information indicative of the beginning of a frame of the image sensor, wherein the frame comprises a period of time having an exposure period followed by a readout period in which exposure values are read from the sensor elements row by row;
means for obtaining at least one distance value indicative of at least one distance of the image sensor to at least one object viewable by the image sensor; and means for, for each time of a plurality of times during the frame:
obtaining respective movement data indicative of translation of the apparatus in a direction along a third axis orthogonal to the first axis and the second axis, the translation corresponding to the respective time;
determining a respective value of a time-dependent function based at least in part on the information indicative of the beginning of the frame, wherein the respective value of the time-dependent function is dependent on the respective time in relation to the frame; and
causing an adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

20. The apparatus of claim 19, wherein the time-dependent function is indicative of which row of sensor elements of the image sensor is exposed at a given time.

21. The apparatus of claim 19, wherein the time-dependent function is based on a number of rows of sensor elements of the image sensor.

22. The apparatus of claim 19, wherein:
the information indicative of the at least one distance value of the image sensor to the at least one object comprises information indicative of a plurality of distance values, wherein each distance value is indicative of a distance of the image sensor to the least one object; and
for each time of the plurality of times during the frame, the at least one distance value comprises a respective distance value of the plurality of distance values.

23. The apparatus of claim 19, wherein the means for obtaining the at least one distance value comprises means for obtaining the at least one distance value from an autofocus module of the apparatus.

24. The apparatus of claim 23, further comprising means for obtaining, from the autofocus module, at least one priority value related to the at least one distance value, wherein, for each time of the plurality of times during the frame, the respective position is additionally at least partially based on the at least one priority value related to the at least one distance value.

25. The apparatus of claim 19, further comprising, means for determining, prior to the beginning of the frame, a length of the exposure period and a length of the readout period.

26. The apparatus of claim 25, further comprising:
means for determining that the length of the exposure period does not exceed a threshold length in relation to the length of the readout period;
wherein the means for determining the respective value of the time-dependent function for each time of the plurality of times during the frame are configured to do so in response to determining that the length of the exposure period does not exceed the threshold length of the readout period.

27. The apparatus of claim 25, further comprising:
means for determining, prior to the beginning of the frame, that a length of the exposure period exceeds a threshold length in relation to a length of the readout period; and
means for decreasing the length of the exposure period, in response to determining that the length of the exposure period exceeds the threshold length of the readout period, such that the length of the exposure period does not exceed the threshold length of the readout period, and at least partially compensating for the decrease in the length of the exposure period by:
increasing an ISO of the image sensor,
widening an aperture of the apparatus configured to adjust an amount of light to which the image sensor is exposed, or
both.

28. A non-transitory computer-readable medium having instructions embedded thereon for providing synchronized optical image stabilization in a camera assembly having an adjustable lens, the instructions, when executed by one or more processing units, cause the one or more processing units to:
for an image sensor of the camera assembly with sensor elements disposed in rows oriented in a direction along a first axis and columns oriented in a direction along a second axis, obtain information indicative of the beginning of a frame of the image sensor, wherein the frame comprises a period of time having an exposure period followed by a readout period in which exposure values are read from the sensor elements row by row;
obtain at least one distance value indicative of at least one distance of the image sensor to at least one object viewable by the image sensor; and
for each time of a plurality of times during the frame:
obtain respective movement data indicative of translation of the camera assembly in a direction along a third axis orthogonal to the first axis and the second axis, the translation corresponding to the respective time;
determine a respective value of a time-dependent function based at least in part on the information indicative of the beginning of the frame, wherein the respective value of the time-dependent function is dependent on the respective time in relation to the frame; and
cause the adjustable lens to be moved to a respective position relative to the image sensor during the frame, wherein the respective position in a direction along the first axis, in a direction along the second axis, or both, is at least partially based on the respective movement data, the respective value of the time-dependent function, and the at least one distance value.

29. The non-transitory computer-readable medium of claim 28, wherein the time-dependent function is indicative of which row of sensor elements of the image sensor is exposed at a given time.

30. The non-transitory computer-readable medium of claim 28, wherein the time-dependent function is based on a number of rows of sensor elements of the image sensor.

31. The non-transitory computer-readable medium of claim 28, wherein:
the information indicative of the at least one distance value of the image sensor to the at least one object comprises information indicative of a plurality of distance values, wherein each distance value is indicative of a distance of the image sensor to the least one object; and
for each time of the plurality of times during the frame, the at least one distance value comprises a respective distance value of the plurality of distance values.

32. The non-transitory computer-readable medium of claim 28, wherein the instructions that cause the one or more processing units to obtain the at least one distance value further comprise instructions that, when executed by one or more processing units, cause the one or more processing units to obtain the at least one distance value from an autofocus module of the camera assembly.

33. The non-transitory computer-readable medium of claim 32, further comprising instructions that, when executed by one or more processing units, cause the one or more processing units to obtain, from the autofocus module, at least one priority value related to the at least one distance value, wherein, for each time of the plurality of times during the frame, the respective position is additionally at least partially based on the at least one priority value related to the at least one distance value.

34. The non-transitory computer-readable medium of claim 28, further comprising instructions that, when executed by one or more processing units, cause the one or more processing units to determine, prior to the beginning of the frame, a length of the exposure period and a length of the readout period.

35. The non-transitory computer-readable medium of claim 34, further comprising instructions that, when executed by one or more processing units, cause the one or more processing units to determine that the length of the exposure period does not exceed a threshold length in relation to the length of the readout period;

wherein determining the respective value of the time-dependent function for each time of the plurality of times during the frame is in response to determining that the length of the exposure period does not exceed the threshold length of the readout period.

36. The non-transitory computer-readable medium of claim 34, further comprising instructions that, when executed by one or more processing units, cause the one or more processing units to:

prior to the beginning of the frame, determine that a length of the exposure period exceeds a threshold length in relation to a length of the readout period; and in response to determining that the length of the exposure period exceeds the threshold length of the readout period, decrease the length of the exposure period such that the length of the exposure period does not exceed the threshold length of the readout period, and at least partially compensating for the decrease in the length of the exposure period by:

increasing an ISO of the image sensor, widening an aperture of the camera assembly configured to adjust an amount of light to which the image sensor is exposed, or both.

* * * * *